United States Patent
Kovacs

[15] 3,690,806
[45] Sept. 12, 1972

[54] EXTRUSION DIE HEAD WITH REVERSED-FLOW AND ADJUSTABLE-CHOKE STRUCTURE

[72] Inventor: Lloyd Kovacs, Somerset, N.J.
[73] Assignee: Midland-Ross Corporation, Cleveland, Ohio
[22] Filed: Oct. 15, 1970
[21] Appl. No.: 80,977

[52] U.S. Cl. ............................ 425/467, 425/380
[51] Int. Cl. .................................... B29f 3/01
[58] Field of Search ...... 18/12 B, 30 JM, 30 JT, 14 R, 18/14 G, 12 DM, 12 N, 14 P, 14 RR, 14 V; 425/376, 380, 461, 466, 467

[56] References Cited

UNITED STATES PATENTS

| | | | |
|---|---|---|---|
| 3,546,743 | 12/1970 | Roth | 18/14 P |
| 3,010,154 | 11/1961 | Swenson | 18/30 JT X |
| 2,405,039 | 7/1946 | Jesionowski | 18/12 DM |
| 3,090,995 | 5/1963 | Amsden | 18/5 BE X |
| 2,688,154 | 9/1954 | Huckfeldt | 18/14 G |
| 3,418,685 | 12/1968 | Anderson et al. | 18/12 N |
| 2,978,748 | 4/1961 | McCauley et al. | 425/380 |
| 3,307,217 | 3/1967 | Cameron | 425/376 X |

Primary Examiner—J. Spencer Overholser
Assistant Examiner—David S. Safran
Attorney—Woodrow W. Portz and Irvin L. Groh

[57] ABSTRACT

A die head especially suitable in producing blown film and pipe wherein the parts are internally shaped to define a circular manifold chamber resulting from annular tongue-and-groove structure whereby a short axial reversal in the generally forward flow of material through the die head may be effected. The die head, in a preferred form, contains an axially adjustable choke ring within the groove of the tongue-and-groove structure for varying back pressure on the material supplied to the die head.

4 Claims, 3 Drawing Figures

Patented Sept. 12, 1972

3,690,806

INVENTOR.
LLOYD KOVACS

BY

*M M Porth*
ATTORNEY

EXTRUSION DIE HEAD WITH REVERSED-FLOW AND ADJUSTABLE-CHOKE STRUCTURE

BACKGROUND

In obtaining satisfactory extrusion of thin-walled tubes or parisons from die heads, extreme uniformity of temperature, texture, and rate of flow is essential in order to obtain product, such as film, which is free of defects as it leaves the discharge orifice of the die. In making the present invention, it is recognized that slight complex variations in the flow of molten plastic through a tube-forming die, especially a film-forming die, cause obvious defects in the film. It is recognized heretofore that some restriction in the passage of melt causing back pressure, particularly in the less advanced spaces in the flow route of the melt within the die, is desirable for avoiding variations in temperature, texture, and flow.

In making this invention, it is further recognized that there are differences in the behavoir of various thermoplastic resins at respective optimum extruding temperatures which cause an interior die configuration which is suitable for one resin to be unsuitable for another.

Hence, it is an important object of this invention to provide a tube or film-blowing die head of compact design which is capable of discharging an exceedingly homogeneous product in blemish-free condition and at uniform thickness.

Another object is to provide die heads having internal material-forwarding manifolds in accordance with the foregoing object in which structure for feeding the manifolds may be arranged for passage of supply melt along the center of a die or through the side of the die.

A further object is to provide a die having adjustable structure for varying the restriction to the passage of melt through the die head to obtain satisfactory product under conditions of varying temperature, viscosity, and swelling characteristics as the product issues from the die.

The die head has, in a conventional sense, a body member having a longitudinal axis and an inner surface defining a transversely circular longitudinally-extending opening centered along the axis, an adapter member by which the die head is secured to an extruder or other source for melted plastic and providing an inlet passageway for the die head, and a mandrel member which extends generally coaxially within the body member to form an annular region therebetween through which the melt passes longitudinally through the die head and between tube-forming die surfaces.

BRIEF SUMMARY

The present invention resides in the shaping of the above-described members in such a manner as to define an axially-extending annular tongue, and a groove in one or two of the members which receives the tongue in spaced relation with groove-defining surfaces. The tongue-and-groove structure thus provides a flow route in which material undergoes reversal of axial direction while moving in a generally radial direction into an annular fluid-conducting region between the inner surface of the body member and the outer surface of the mandrel member. In the preferred embodiment, the groove is formed with sufficient depth as to house a choke ring which may be traversed in an axial direction within the groove by an adjusting means capable of fixedly supporting the choke ring in various positions. By such change of position, the distance of the ring from the end surface of the tongue may be adjusted to vary the capacity of the flow route for melted material around the end of the tongue, and to create a suitable back pressure upstream from the tongue. By using the choke ring to constrict the flow route, the back pressure may be raised with corresponding changes in the linear rate of flow and amount of material passing around the end of the tongue. With experience, adjustment of the choke ring is made in accordance with any particular set of operating conditions adopted and in view of differences in the physical and chemical nature of a thermoplastic resin to be passed through the die head equipment to attain desired extrusion quality.

FIGURES OF THE DRAWING

In the drawing with respect to which the invention is described:

Figure 1:
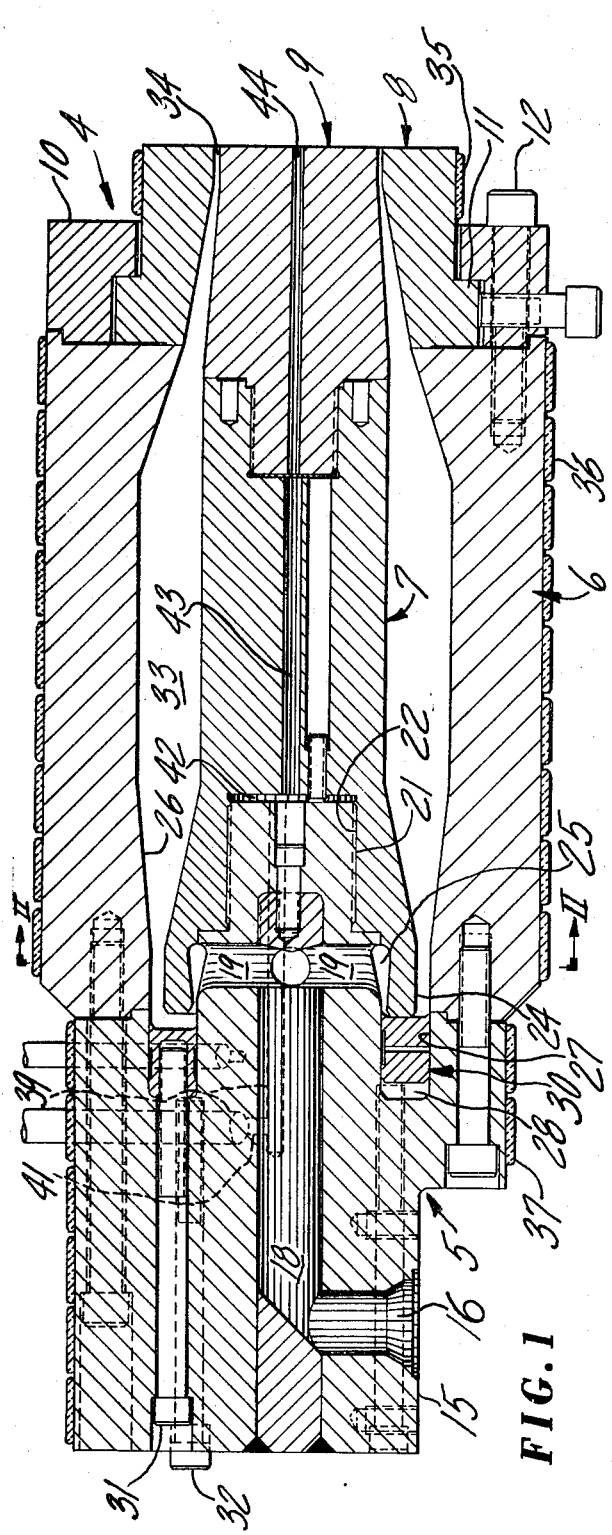
FIG. 1 is a longitudinal section along a diametral plane of a die head in accordance with one embodiment of the invention.

The drawing illustrates an relate to a first-described embodiment in which an extrusion die head 4 comprises, as its major parts, an adapter 5, a generally cylindrical body member 6 attached to the adapter, a mandrel 7 attached to the adapter, detachable and replaceable parison or tube-forming elements comprising an annular head ring 8 attached to the body 6 and a mandrel tip 9 attached to the mandrel 7. The extrusion head further includes a retainer ring 10 which engages a front-facing surface of the head ring 8 and is held approximately against the front end of the body 6 by means, such as cap screws 12.

DETAILED DESCRIPTION

The adapter 5 is a portion of the extrusion head by which the head is attached to a supply source for extrudate, such as a screw extruder or injection cylinder not shown. Junction with such a source is made along a flat laterally-facing surface 15 with a discharge duct of the supply device in alignment with a radially-extending port 16 opening in the surface 15. The port 16 joins with an axial bore 18 which extends in lengthwise concentric relation with the axis of the head into a manifold region comprising radial channels 19 extending to the outer surface of the adapter 5 from the front or fluid-discharging end of the bore. The adapter 5 is constructed with a longitudinal projection including a cylindrically-shaped exteriorly-threaded boss 21 received in a complementary interiorly-threaded recess 22 of the mandrel 7. The frontwardly-projecting portion of the adapter also contains the channels 19 the outer ends of which are contiguous with the primary circular region enclosed by the body 6.

To complete the manifold region consisting in part of the channels 19, the mandrel 7 has an annular tongue 24 in concentric relation with the projecting portion of the adapter and in sufficiently spaced relation with the radially-outer ends of the channels 19 to define a circular space 25 contiguous with all channels 19 to complete the above-mentioned manifold region. The tongue 24 is also in inward radially-spaced relation with the inner surface 26 of the body 6 and a radially inwardly-facing surface 27 of the adapter which partially form a deep annular recess 28 for receiving a choke ring 30.

Figure 3:
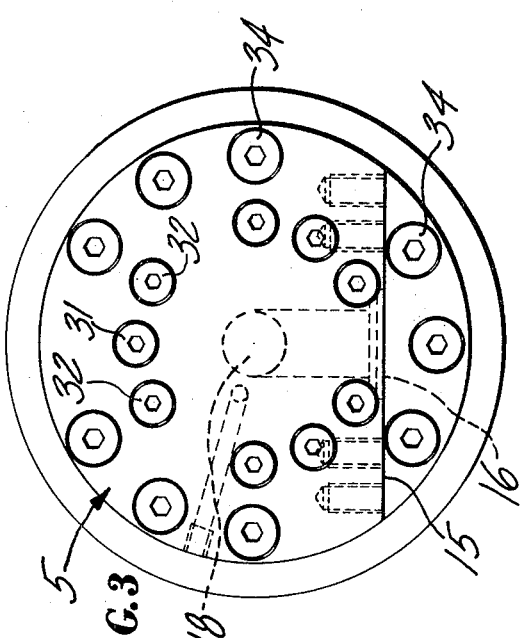
FIG. 3 is a bottom end view of the die head of FIG. 1.

As FIGS. 1 and 3 show, the choke ring 30 is supported in a precise axial position by two sets of cap screws extending through the adapter in an axial direction along a single circumference or circle. One set of cap screws 31 have their heads in seated relation with a shoulder formed by a counterbore in the adapter, in threaded adjustable relation with the choke ring. The other set of cap screws 32 are in threaded relation with the adapter but in compressive engaging relation with the rear surface of the choke ring. By adjustment of the two sets of cap screws, the choke ring may be adjusted and fixed in position at any distance from the tongue 24 permitted by the depth of the recess 28 to establish a gap or a clearance between the tongue and the choke ring.

As the adapter is secured in sealed relation with the body 6 by a plurality of cap screws 34, a flow path is now defined through the head commencing with the port 16 and continuing through the bore 18, channels 19, the circular space 25, the circular gap 32, and a region between the outer surface of the mandrel 7 and the inner surface of the body 6 contiguous with the gap 32. The flow path terminates in the annular discharge orifice 34 of the head and is completed by the annular clearance between the mandrel tip 9 and the head ring 8. The latter elements are normally replaceable to obtain orifices of different sizes with corresponding product tubes of different thicknesses and diameters. The extrusion head, as illustrated in FIGS. 1, 2 and 3, has attached to various outer surfaces thereof electrical strip heaters 35, 36 and 37.

Figure 2:
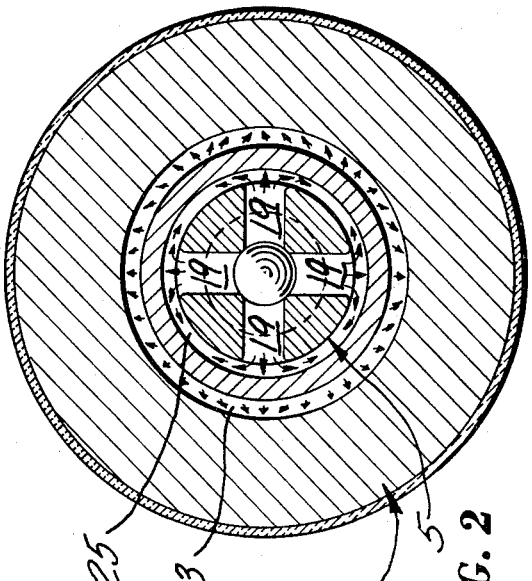
FIG. 2 is a diametral section taken along line II—II of FIG. 1.

As the extrusion head of FIGS. 1-3 is of the film-blowing type, passage of air for the head from a supply tube 39 is provided by way of a lateral duct 41, an axial duct 39 joining therewith within the adapter 5 and terminating at the end of the boss 21 in an end clearance 42. The duct 39 communicates through the end clearance with an axially-centered duct 43 and an axially-centered duct 44 of the head mandrel connected in threaded relationship with the mandrel 7.

I claim:

1. An extrusion die head comprising:
a body member having a longitudinal axis and an inner surface defining a transversely circular longitudinally-extending opening centered along said axis;
an adapter member secured to said body and having an inlet passageway, said adapter closing one end of the opening except for communication thereof with said passageway;
a mandrel member received in said opening and means for locating said mandrel member in fixed coaxial relation with said other members, said mandrel member being radially spaced from the inner surface to define an annular region for passage of a fluid lengthwise of said axis to outwardly of said die head; and
said members having portions defining axially-extending, annular and concentric fluid-conducting, tongue-and-groove means located between and connecting the passageway and said region and having all portions of the tongue means in spaced relation with the groove means to provide at least one instance of axial reversal in the flow of fluid from said passageway to said region;
a choke ring received in said groove means in opposed relation with the end surface of the tongue means, said groove means being of sufficient depth permitting movement of the ring toward and away from said end surface;
adjustable means carried by said adapter member for moving said ring in an axial direction toward and away from said end surface.

2. The die head of claim 1 wherein:
said groove means includes a groove in the adapter of such depth in an axial direction as to substantially and completely accommodate the choke ring.

3. The die head of claim 1 comprising:
one set of puller-type cap screws supported with the heads thereof seated on said adapter member and end portions in threaded adjustable relation with said choke ring, and another set of pusher-type cap screws in threaded relation with the adapter member with the ends thereof in engaging relation with the end surface of said choke ring in opposed relation with said tongue means, all said cap screws extending in generally parallel relation with said passageway.

4. The die head of claim 3 wherein:
both sets of cap screws are arranged along a single circumference centered about said longitudinal axis.

* * * * *